(12) United States Patent
Sames

(10) Patent No.: US 9,803,659 B2
(45) Date of Patent: Oct. 31, 2017

(54) CLIPPING MODULE DRIVE DEVICE

(71) Applicant: Poly-clip System GmbH & Co. KG, Hattersheim (DE)

(72) Inventor: Jörg Sames, Alten Buseck (DE)

(73) Assignee: Poly-Clip System GmbH & Co. KG (DE)

( * ) Notice: Subject to any disclaimer, the term of this patent is extended or adjusted under 35 U.S.C. 154(b) by 971 days.

(21) Appl. No.: 13/958,533

(22) Filed: Aug. 2, 2013

(65) Prior Publication Data

US 2014/0033652 A1 Feb. 6, 2014

(30) Foreign Application Priority Data

Aug. 3, 2012 (EP) ..................................... 12179301

(51) Int. Cl.
*F15B 11/12* (2006.01)
*F15B 15/14* (2006.01)
(Continued)

(52) U.S. Cl.
CPC .......... *F15B 11/122* (2013.01); *A22C 11/125* (2013.01); *F15B 15/1409* (2013.01); *B65B 51/04* (2013.01)

(58) Field of Classification Search
CPC ..... B65B 51/04; B65B 51/043; B65B 51/046; A22C 11/02; A22C 11/04; A22C 11/06; A22C 11/12; A22C 11/125; F04B 1/12; F15B 2211/7653; F15B 11/12; F15B 11/121; F15B 11/122; F15B 11/123;
(Continued)

(56) References Cited

U.S. PATENT DOCUMENTS 2,551,246 A * 5/1951 D'Arcey ............... F15B 11/123
91/167 R
3,060,495 A * 10/1962 Muller .................... A22C 11/02
452/37
(Continued)

FOREIGN PATENT DOCUMENTS

DE 19644074 A1 5/1998
DE 19738298 C1 4/1999
(Continued)

*Primary Examiner* — Stephen F Gerrity
*Assistant Examiner* — Joshua Kotis
(74) *Attorney, Agent, or Firm* — Fitch Even Tabin & Flannery LLP

(57) ABSTRACT

The present invention relates to a drive device and a method for reversibly linearly moving a clipping module of a clipping machine. The drive device comprises a piston/cylinder assembly including a first piston and a housing including a first cylinder portion in which the first piston is arranged, the housing is reversibly movable relative to the first piston, a second piston coaxially aligned to the first piston, and a third piston coaxially aligned to the first piston. The drive device further comprises four variable cylinder volumes, a first cylinder volume between the first piston and the first cylinder portion, a second cylinder volume, a third cylinder volume, and a fourth cylinder volume, wherein each cylinder volume is coupled to a pressure source for being varied in order to reversibly move the clipping module, between a release position and a discharge position of the clipping machine.

11 Claims, 6 Drawing Sheets

(51) Int. Cl.
*A22C 11/12* (2006.01)
*B65B 51/04* (2006.01)

(58) Field of Classification Search
CPC ..... F15B 11/18; F15B 11/036; F15B 11/0365; F15B 15/1409; F15B 15/149; F15B 15/223; F15B 15/224; F15B 9/16
USPC ........... 53/138.2, 138.4, 417; 91/170 R, 176, 91/490; 92/13.1, 13.6, 13.4, 117 A, 92/117 R; 452/48
See application file for complete search history.

(56) References Cited

U.S. PATENT DOCUMENTS

| | | | | | |
|---|---|---|---|---|---|
| 3,140,509 | A | * | 7/1964 | Muller | A22C 11/02 452/45 |
| 3,592,108 | A | * | 7/1971 | Rosaen | F15B 11/024 91/422 |
| 3,621,513 | A | | 11/1971 | Kupcikevicius | |
| 3,713,364 | A | * | 1/1973 | Francia | F15B 11/123 91/167 R |
| 3,805,329 | A | * | 4/1974 | Kollross | A22C 11/00 452/34 |
| 3,882,759 | A | * | 5/1975 | Formwalt | F15B 11/125 91/167 R |
| 3,975,795 | A | * | 8/1976 | Kupcikevicius | A22C 11/02 138/118.1 |
| 3,994,539 | A | * | 11/1976 | Gottlieb | F15B 15/1414 384/49 |
| 4,017,941 | A | * | 4/1977 | Raudys | A22C 11/02 138/118.1 |
| 4,199,050 | A | * | 4/1980 | Moller | B65B 61/28 198/429 |
| 4,205,594 | A | * | 6/1980 | Burke | F15B 11/123 91/178 |
| 4,773,128 | A | * | 9/1988 | Stanley | A22C 11/0245 452/31 |
| 5,014,602 | A | * | 5/1991 | Iwata | F15B 11/123 92/117 A |
| 5,165,322 | A | * | 11/1992 | Moody | F15B 11/123 92/130 R |
| 5,167,567 | A | * | 12/1992 | Evans | A22C 11/125 452/30 |
| 5,191,825 | A | * | 3/1993 | Beneteau | B25D 9/08 91/173 |
| 5,193,430 | A | * | 3/1993 | Ilgovsky | F15B 15/24 92/13.1 |
| 5,586,482 | A | * | 12/1996 | Leonard | F15B 11/036 91/519 |
| 5,775,985 | A | * | 7/1998 | Stanley | A22C 11/02 452/29 |
| 6,217,436 | B1 | | 4/2001 | Hanten et al. | |
| 6,298,635 | B1 | | 10/2001 | Bienert et al. | |
| 6,604,338 | B1 | | 8/2003 | May et al. | |
| 2002/0066363 | A1 | * | 6/2002 | Holt | F15B 11/123 92/13.1 |
| 2009/0145085 | A1 | | 6/2009 | May et al. | |
| 2010/0024205 | A1 | * | 2/2010 | Hedman | F15B 11/123 29/700 |
| 2011/0120120 | A1 | * | 5/2011 | Pawelski | F15B 15/1409 60/527 |

FOREIGN PATENT DOCUMENTS

EP 0268206 A1 5/1988
EP 2363027 A1 9/2011

* cited by examiner

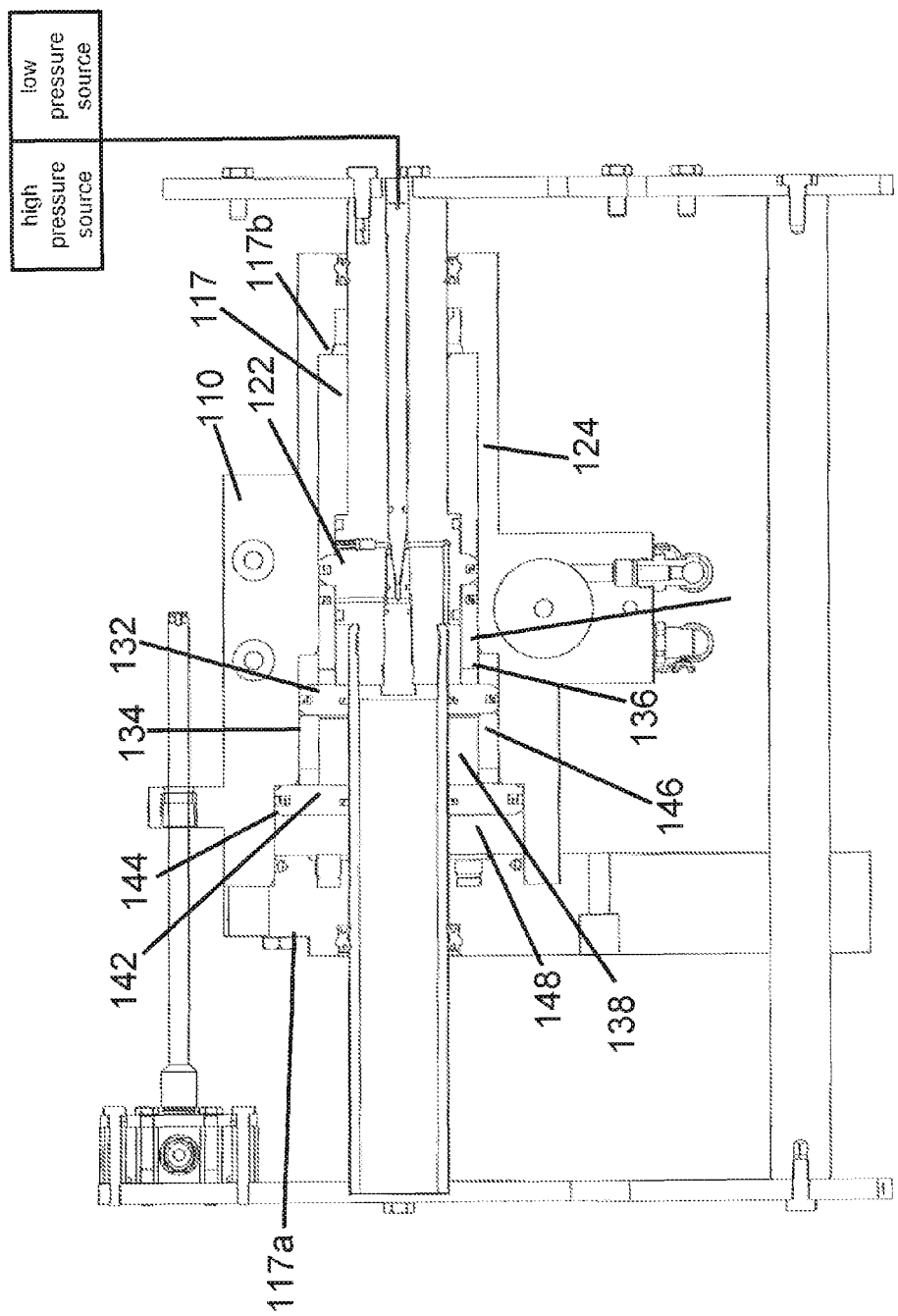

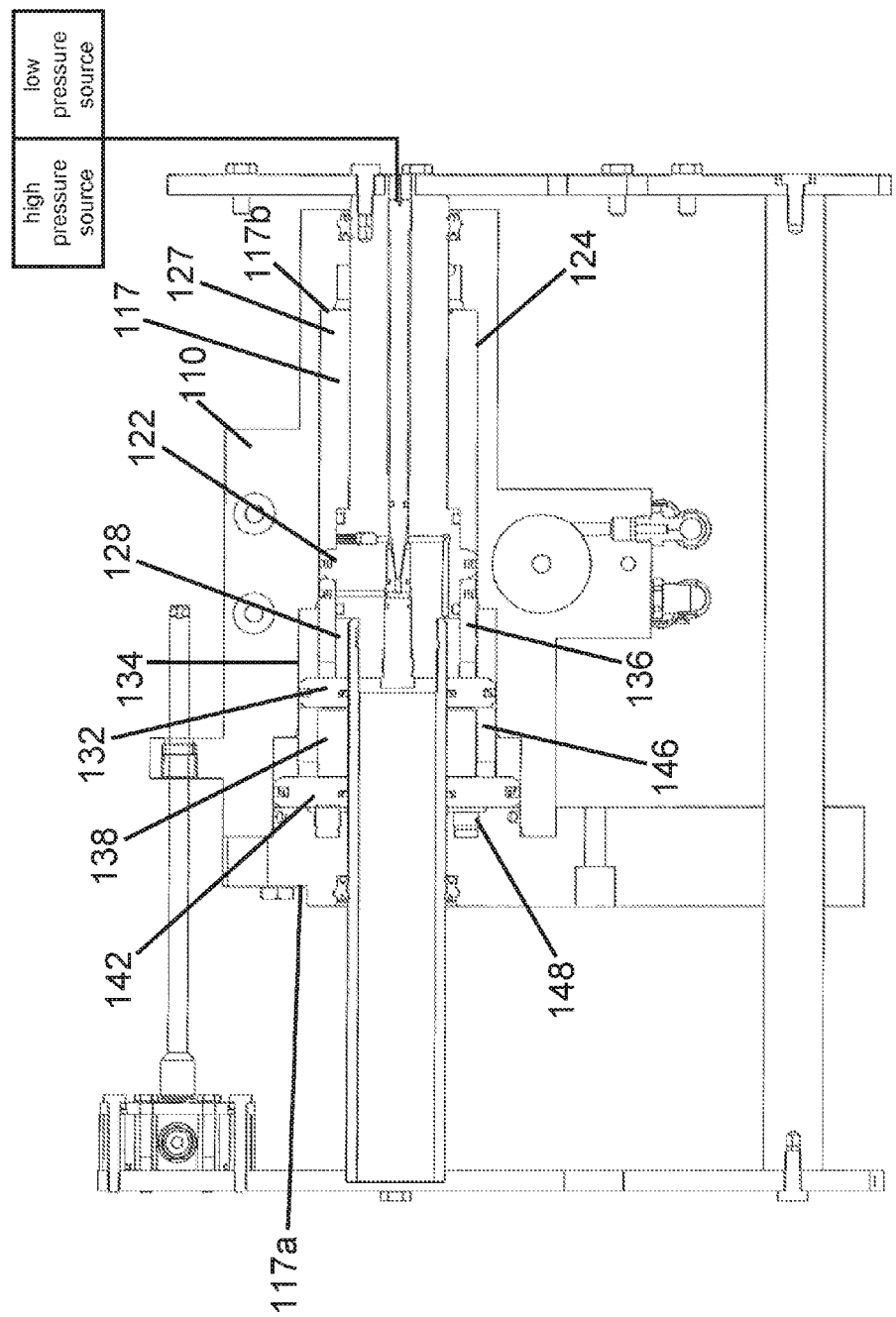

CLIPPING MODULE DRIVE DEVICE

This application claims priority to, and the benefit of, European Patent Application No. 12 179 301.2-1260 filed Aug. 3, 2012 with the European Patent Office, which is hereby incorporated by reference.

BACKGROUND OF THE INVENTION

The present invention relates to a device for reversibly linearly moving a clipping module of a clipping machine as described herein.

In practice, it is known that, for example in the production of sausage-shaped products, like sausages, filling material is fed by a filling machine through a filling tube of a clipping machine into a tubular packaging casing which is stored on the filling tube and which is closed at its front end, i.e. the end pointing in the feeding direction of the filling material by at least one closure means, like a closure clip. The tubular packaging casing is pulled-off from the filling tube by the feeding pressure while being filled. After a predetermined volume of filling material has been filled into said tubular packaging casing, a displacer arrangement or gathering means, respectively with a first and a second displacer unit which can each be formed by a pair of reversibly moveable displacement elements, a plait-like portion of the tubular packaging casing is formed which is at least substantially free of filling materials. The clipping machine then places and closes at least one closure clip at the plait-like portion forming the rear end of the sausage shaped product, i.e. the end pointing against the feeding direction by respective closing tools which are reversibly movable towards the plait-like portion.

From DE patent 197 38 298, a clipping machine is known, wherein the first and the second closing tool, a punch and a die, are mounted to first ends of respective closing levers. Said closing levers are coupled by their second ends to a common pivot axis. For reversibly moving the closing tools between their opened and closed position, in order to place and close a closure clip on the filled and gathered tubular packaging casing, the closing levers are driven by a cam plate. The closing levers with the closing tools and the gathering means are integrate into the clipping machine and are driven by a common drive.

From DE laid open document 196 44 074, a clipping machine is known, wherein the first and second closing tools are linearly moved between their opened and closed position. The closing tools are driven by respective piston/cylinder drives. The gathering means are also linearly movable by a respective separate drive means. Also in this known clipping machine, the closing tools and the gathering means are integrate into the clipping machine.

In this known clipping machines, the closing tools as well as the gathering means are positioned in fixed relation to the filling tube, i.e. in a defined distance to the end of the filling tube facing the clipping tools. For removing a casing brake from the filling tube or for refilling tubular casing material to the filling tube, the clipping tools and the gathering means have to be moved in axial direction requiring respective additional space.

Thus, it is an object of the present invention, to provide a device and a method with which the above mentioned drawbacks can be overcome and which allows a compact construction of a clipping machine.

SUMMARY OF THE INVENTION

The aforesaid object with respect to the device is achieved by the features as described herein.

According to the present invention, there is provided a drive device for reversibly linearly moving a clipping module of a clipping machine, the clipping machine comprises a filling tube through which a filling material is fed in a filling direction into a tubular or bag-shaped packaging stored on the filling tube, between a release position and a discharge position, thereby passing at least two further intermediate positions. The drive device comprises a piston/cylinder assembly which includes a first piston fixedly adjusted to a framework of the clipping machine and a housing including a first cylinder portion in which the first piston is arranged, the housing is reversibly movable relative to the first piston, a second piston coaxially aligned to the first piston and reversibly movable in a second cylinder portion arranged in the housing, and a third piston coaxially aligned to the first piston and reversibly movable in a third cylinder portion arranged in the housing. The piston/cylinder assembly further includes four variable cylinder volumes, a first cylinder volume between the first piston and the first cylinder portion, a second cylinder volume between the first and the second piston, a third cylinder volume between the second and the third piston and a fourth cylinder volume between the third piston and the third cylinder portion, wherein each cylinder volume is coupled to a pressure source for being varied in order to reversibly move the clipping module coupled to the housing, between the release position and the discharge position.

The drive device according to the present invention thereby allows a linear movement of the clipping module relative to the filling tube before or during a clipping cycle or between two subsequent clipping cycles, in order to provide additional space in the region of the end of the filling tube facing the clipping module, e.g. for refilling tubular casing material to the filling tube. Moreover, depending on the axial length of the cylinder portions, the clipping module may not only be moved into the release position and the discharge position, but also in predefined intermediate positions, e.g. for a defined movement of the casing brake, which then may be coupled to the clipping module. In the discharge position, the just produced sausage-shaped product is discharged from the clipping machine by moving the clipping module towards the filling tube, until the left end of the filling tube extends at least into the space between the gathering means or the clipping tools respectively, thereby securely shifting the just produced sausage-shaped product out of the closing area of the clipping machine.

In a preferred embodiment of the drive device, the first, second and third cylinder portion compose a multi-stage cylinder. In other words, the first, second and third cylinder portions do form a common cylinder space with different inner diameters, arranged in order of their diameters. This construction allows a piston at least partially to be moved into the subsequent cylinder portion having a larger diameter than said piston. Thereby, not only the moving path of said piston is extended, in order to be moved into a predefined position, but also the length of the housing, and thus, of the drive device, may be shortened.

In a further preferred embodiment, the drive device comprises a piston rod having a central axis, coaxially aligned to the first, second and third cylinder portion, with the first piston fixedly mounted on the piston rod. This construction allows the housing to be guided along the piston rod when moved relative to the first piston.

In an advantageous embodiment, the second and third piston is reversibly slidably secured on the piston rod for enabling the housing, and the clipping module respectively, to be stopped at predefined intermediate positions between the release position and the just produced sausage-shaped product position.

For enabling a simple construction and for allowing the second and third piston to be shifted along the piston rod, the second and third piston is formed by an annular disc.

The second and third piston has to be positioned in a defined distance to each other and to the first piston according to the intermediate positions of the clipping module. Thus, the second and third piston comprises a coaxially aligned hollow cylindrical protrusion, which acts as spacer rings.

In order to move the housing and the second and third piston along the piston rod and relative to the first piston, each of the four variable cylinder volumes is coupled to a high pressure source and a low pressure source. When coupled to a high pressure source, the respective cylinder volume may be increased, whereas, when coupled to a low pressure source, the respective cylinder volume may be decreased.

In the present invention, the "high pressure" provided by a high pressure source, has to be understood as a pressure value higher than the "low pressure" from the low pressure source. In other words, a low pressure e.g. may be the present atmospheric pressure and the low pressure source is the atmosphere to which the cylinder volumes may be connected. Accordingly, a high pressure source provides a pressure with a value higher than the atmospheric pressure. It has to be understood, that the low pressure may also have a higher or lower value than the present atmospheric pressure.

According to a further advantageous embodiment of the inventive drive device, the piston rod comprises channels for connecting the first and second cylinder volume to the high and low pressure sources. Since the piston rod is fixedly mounted relative to the clipping machine, the connector elements for connecting the first and second cylinder volume to the high pressure source and the low pressure source are also in fixedly arranged relative to the clipping machine and need not to be moved together with the housing of the drive device, whereby wear and damages are avoided.

The connection of the first and second cylinder volume to the pressure sources may be controlled in various ways. In a simple construction, a control pin is arranged in a central bore of the piston rod, and is axially movable within said central bore, for controlling the connection of the first and second cylinder volumes to the high and low pressure sources.

It is further advantageous that the housing comprises channels for connecting the third and fourth cylinder volume to the high and low pressure sources. Alternatively or additionally thereto, at least some of the channels for connecting the third and fourth cylinder volume to the high and low pressure sources may be arranged in the piston rod.

For preventing the housing from rotating around the piston rod, the drive device further comprises a guide bar arranged parallel to the piston rod, for guiding the housing when reversibly moved between the release position and the discharge position. The housing comprises a respective guide element which is slidably secured to said guide bolt.

For monitoring the clipping module when moved into the respective position, the release position, the discharge position, or one of the intermediate positions, the housing comprises a sensor assembly for sensing the current position of the clipping module.

According to the present invention, there is also provided a method for reversibly linearly moving a clipping module of a clipping machine, between a release position and a filling position, the clipping machine comprises a filling tube through which a filling material is fed in a filling direction into a tubular or bag-shaped packaging stored on the filling tube, wherein the drive device comprises a piston/cylinder assembly with at least a first piston fixedly adjusted to a framework of the clipping machine, and a housing with a first cylinder portion, the piston/cylinder assembly includes at least a first and a second variable cylinder volume. The method comprises the steps of connecting the first cylinder volume to a low pressure source and connecting the second cylinder volume to a high pressure source, for moving the clipping module together with the housing in the release position, and connecting the first cylinder volume to a high pressure source and connecting the second cylinder volume to a low pressure source, for moving the clipping module together with the housing in the discharge position.

In case that the drive device includes a second piston and a third piston, a second and a third cylinder portion and a third and fourth variable volume, the method further comprises the steps of connecting the third and fourth variable volume to a low pressure source and/or a high pressure source for positioning the clipping module in intermediate positions.

The inventive method provides the same advantages as disclosed in conjunction with the inventive drive device.

Further advantages and preferred embodiments will be described in the following together with the drawings listed below. The expressions "left", "right", "below" and "above" used in the following description, are referred to the drawings in an alignment such that the reference numbers and the notation of the Figs. used can be read in normal.

BRIEF DESCRIPTION OF DRAWINGS

FIG. 5: is a schematic cross-sectional view of the drive device in a vertical plane along line B-B in FIG. 1, with the housing in a second intermediate position; and FIG. 6: is a schematic cross-sectional view of the drive device in a vertical plane along line B-B in FIG. 1, with the housing in the discharge position;

DETAILED DESCRIPTION

Figure 1:
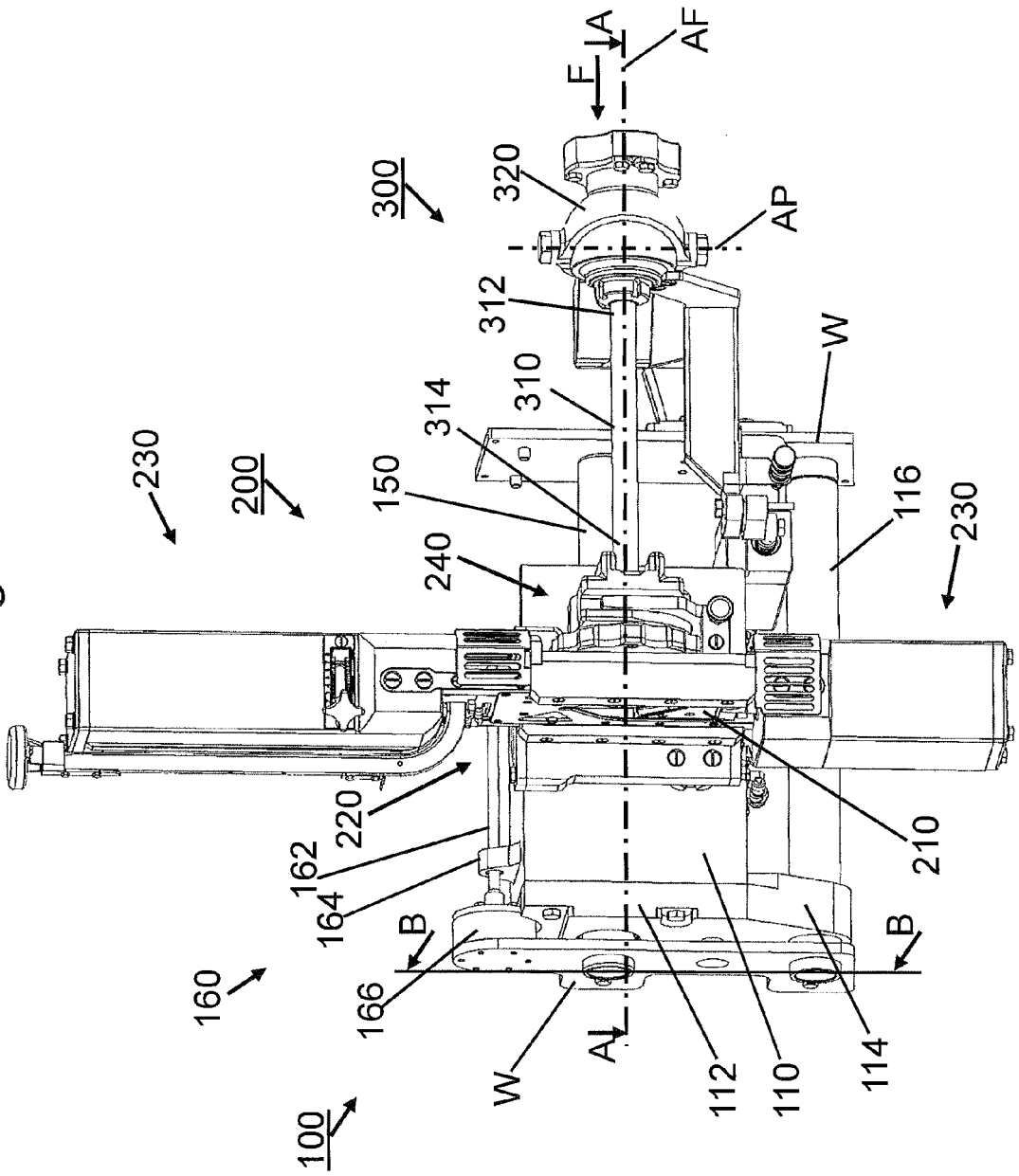
FIG. 1: is a schematic and perspective view of a drive device according to the present invention together with a clip module and a filling tube.

FIG. 1 is a schematic and perspective view of a drive device 100 according to the present invention, which is mounted on a partly depicted framework W of a clipping machine (not shown in detail). As it can be seen from FIGS. 1 and 2, a clipping module 200 is coupled to drive device 100. Moreover, a filling tube assembly 300 is coupled to framework W of the clipping machine.

Drive device 100 comprises a housing 110 in which a piston/cylinder assembly is accommodated, including a piston rod 150 which, in FIG. 1, extends on the right side of housing 110. Drive device 100 further comprises a guide bar 116 positioned in FIG. 1 below piston rod 150 and parallel thereto. Guide bar 116 is also fixedly mounted to framework W of the clipping machine. Housing 110 comprises a coverage 112 secured to housing 110, and having a guide portion 114 which is slibably guided on guide bar 116. Moreover, housing 110 has a hollow space 117 with a first and a second end 117a, 117b. Hollow space 117 is coaxially arranged to axis AP.

Figure 2:
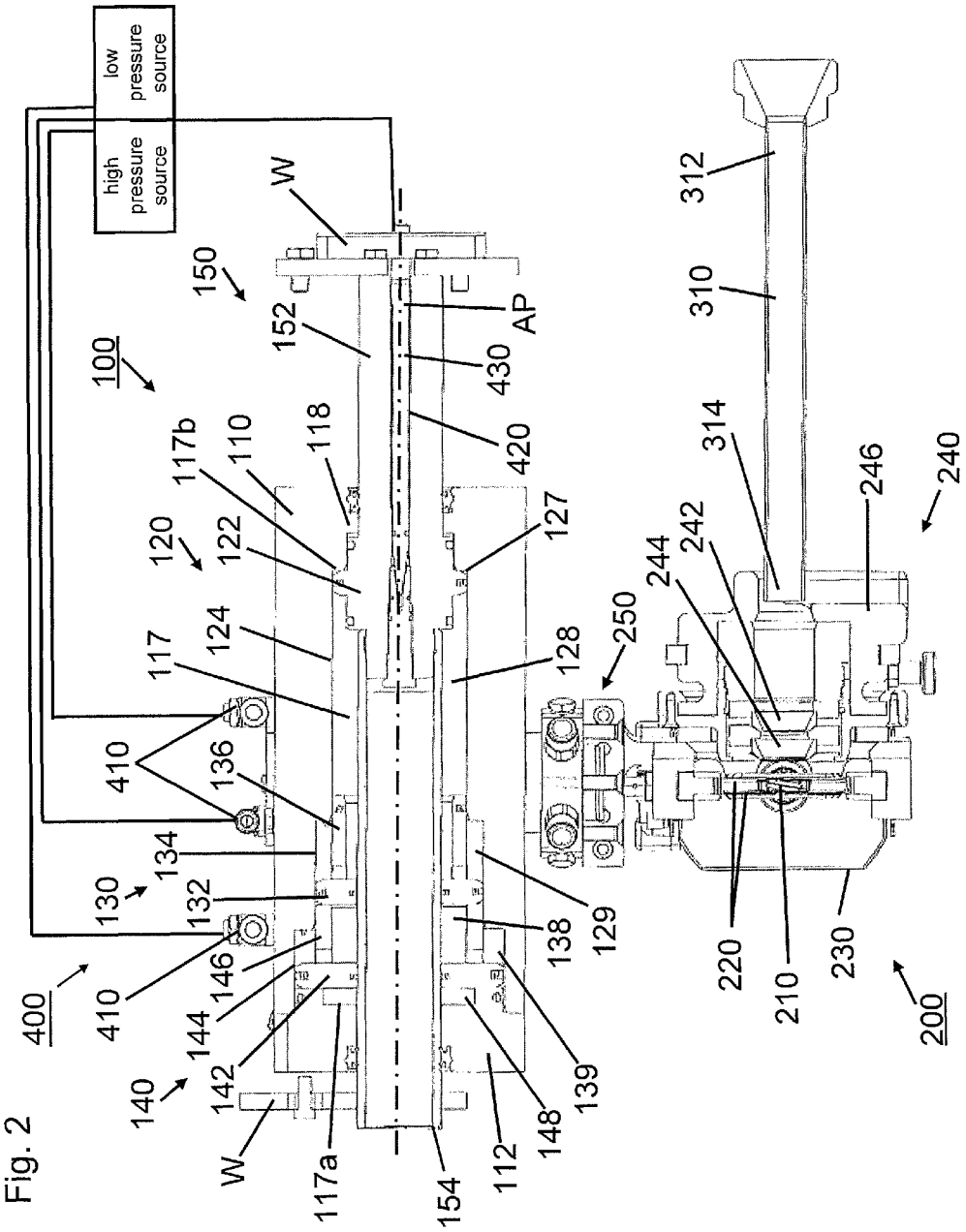
FIG. 2: is a schematic cross-sectional view of the drive device in a horizontal plane along line A-A in FIG. 1.

FIG. 2 shows a schematic cross-sectional view of the drive device of FIG. 1 in a horizontal plane along line A-A in FIG. 1, i.e. through central axis AF of filling tube 110.

As it can be inferred from FIG. 2, clipping module 200 comprises a clipping tool assembly 210 (in FIG. 2, only the die is visible), gathering means 220 formed by two pairs of gathering plates, and drives 230 for clipping tool assembly 210 and gathering means 220, which may constituted by piston/cylinder assemblies. Clipping module 200 is coupled to housing 110 of drive device 100 by a coupling arrangement 250 including pressure connectors for connecting and disconnecting clipping module 200 to and from a pressure source, when being attached to or detached from drive device 100.

Moreover, clipping module 200 comprises a casing brake assembly 240 which, intern, includes a first casing brake ring 242 and a second casing brake ring 244 arranged in a casing brake housing 246. Casing brake assembly 240 is fixedly coupled to clipping module 200 such that casing brake rings 242, 244 are located on filling tube 310 and are aligned to central axis AF of filling tube 310 when in the discharge position. Between the outer surface of filling tube 310 and inner surface of first and second casing brake ring 242, 244, the tubular packaging casing is running during the filling process (filling tube 310 in discharge position).

Filling tube assembly 300, as shown in FIG. 1, is arranged on the right side of clipping module 200 and in front of drive device 100. Filling tube assembly 300 comprises a filling tube 310 having a first end 312 and a second end 314. Filling tube 310 comprises a central axis AP coinciding with the filling direction F for the filling material when being fed through filling tube 310 into the tubular or bag-shaped packaging casing (in the following only cited as tubular packing casing). Filling tube 310 is horizontally and parallel arranged to guide bar 116 of drive device 100, when in the discharge position as shown in FIG. 1. First end 312 can be coupled to a pivot arrangement 320 through which filling tube 310 can be connected with a filling pump (not shown) for feeding filling material through filling tube 310 into the tubular packaging casing. Second end 314 of filling tube 310 facing in filling or feeding direction F, respectively, is directed to clipping module 200. Filling tube 310 may be pivoted at its first end 312 about a vertical pivot axis AP by pivot arrangement 320 between the discharge position and a refill position in which the second end 314 is pivoted away from clipping module 200, e.g. for refilling tubular packaging casing material to filling tube 110.

In order to detect the current position of the clipping module 200, a sensor assembly 160 is provided, which includes a sensor element 162, an actuator element 164 and a connector box 166. Connector box 166 is coupled to framework W of the clipping machine. Sensor element 162 has the form of a pin extending parallel to guide bar 116 above housing 110 of drive device 100. Sensor element 162 is fixedly mounted to connector box 166. Actuator element 164 is coupled to housing 110, and movable along sensor element 162, when clipping module 200 is moved by drive device 100. According to the position of actuator element 164, the position of clipping module 200 may be detected by sensor element 162 for monitoring the movement of clipping module 200. Sensor assembly 160 is coupled to a control unit of the clipping machine (not shown) and provides a signal according to the detected position of clipping module 200.

As it further can be seen in FIG. 2, in housing 110 of drive device 100, a piston cylinder assembly 120, 130, 140 is accommodated, which includes a first piston 122, a first cylinder portion 124, a second piston 132, a second cylinder portion 134, a third piston 142 and a third cylinder portion 144.

First, second and third cylinder portions 124, 134, 144 are formed by circular clearances in hollow space 117 of housing 110, coaxially aligned and subsequently arranged to each other, in order of the size of their diameters, wherein the diameter of first cylinder portion 124 is the smallest and the diameter of third cylinder portion 144 is the largest. Since first, second and third cylinder portions 124, 134, 144 are of different diameters, they thereby compose a multi-stage cylinder. Piston rod 150 is positioned in housing 110 and also coaxially aligned to first, second and third cylinder portions 124, 134, 144.

As it can be seen in FIG. 2, first, second and third cylinder portions 124, 134, 144 are of different axial lengths. First cylinder portion 124 has a length that is larger than the sum of the lengths of second and third cylinder portions 134, 144, whereas second cylinder portion 134 has an axial length that is larger than the axial length of third cylinder portion 144.

It has to be noted that the axial length of the first, second and third cylinder portions 124, 134, 144 is adapted to the over all length of the moving path of clipping module 200 between the release position and the discharge position and the distances of the intermediate positions from the one of the release position or the discharge position.

Piston rod 150 consists of a first portion 152 extending from framework W on the right side of housing 110 to the left into first cylinder portion 124, and a second portion 154 which extends from framework W on the left side of housing 110 to the right into housing 110 and is coupled by its right end to the left end of first portion 152. First and second portion 152, 154 of piston rod 150 have approximately identical outer diameters.

On the left end of first portion 152 of piston rod 150, first piston 122 is formed by a circumferential protrusion. The outer diameter of first piston 122 fits with the inner diameter of first cylinder portion 124.

Second piston 132 is formed by an annular ring having an outer diameter which corresponds to the inner diameter of second cylinder portion 134, and an inner diameter which fits with the outer diameter of piston rod 150, in particular the outer diameter of second portion 154 of piston rod 150. Second piston 132 is slidably arranged on second portion 154 of piston rod 150.

Third piston 142 is also formed by an annular ring having an outer diameter which corresponds to the inner diameter of third cylinder portion 144, and an inner diameter which fits with the outer diameter of second portion 154 of piston rod 150 and is also slidably arranged there on.

Moreover, third piston 142 comprises a hollow cylindrical protrusion which forms an annular ring 146 extending from third piston 142 towards second piston 132. The outer diameter of annular ring 146 matches the inner diameter of second cylinder portion 134 in which annular ring 146 is slidably supported. The axial length of annular ring 146 which is coaxially aligned with piston rod 150, defines the minimum distance between third piston 142 and second piston 132, when abutting against the left side of second piston 132.

Also, second piston 132 comprises a hollow cylindrical protrusion which forms an annular ring 136. Annular ring 136 extends from the right side of second piston 132, as seen in FIG. 2, towards first piston 122. The outer diameter of annular ring 136 matches the inner diameter of first cylinder portion 124, in which annular ring 136 is slidably supported. The axial length of annular ring 136 defines a minimum distance between second piston 132 and first piston 122.

As it also can be seen in FIG. 2, on the right end side of housing 110, a through hole 118 is coaxially arranged to and extends from first cylinder portion 124 to the outside of housing 110. Piston rod 150 is supported in through hole 118 and allows housing 110 to slide along piston rod 150.

Third cylindrical portion 144 terminates at the left end side of housing 110 and is closed by coverage 112. In coverage 112, a through hole 119 is arranged and coaxially aligned to piston rod 150 to allow housing 110 to slide along piston rod 150.

Furthermore, four variable cylinder volumes 127, 128, 138, 148 are formed by first, second and third pistons 122, 132, 142 and first, second and third cylinder portions 124, 134, 144. A first volume 127 is formed between the right side of first pistons 122 and the right end of first cylinder portion 124 (see also FIGS. 4 to 6). In FIG. 2, first cylinder volume 127 is reduced to a minimum since first piston 122 abuts against the right end of first cylinder portion 124. A second cylinder volume 128 is formed between the left side of first piston 122 and the right side of second piston 132. Between the left side of second piston 132 and the right side of third piston 142, a third cylinder volume 138 is formed. And, finally, a fourth cylinder volume 148 is constituted between the left side of third piston 142 and covering 122 closing the left end side of housing 110.

First, second, third and fourth variable cylinder volumes 127, 128, 138, 148 are restricted in axial direction by the respective pistons 122, 132, 142 and housing 110 or coverage 112, respectively. In radial direction, variable cylinder volumes 127, 128, 138, 148 are bordered by the outer surface of piston rod 150 and the inner surfaces of the first, second and third cylinder portion 124, 134, 144. According to FIG. 2, an additional annular volume 129 is formed between the outer surface of annular ring 136 of second piston and the inner surface of second cylinder portion 134. Annular ring 136 comprises radially arranged bores (not shown in FIG. 2), which connect the additional volume 129 to second cylinder volume 128. Accordingly, an additional volume 139 between annular ring 146 and third cylinder portion 144 is coupled via radial bores (also not shown in FIG. 2) to third cylinder volume 138.

First, second, third and fourth variable cylinder volumes 127, 128, 138, 148 are coupled to a low power source and a high power source, respectively, by respective coupling means 400, for enable said first, second, third and fourth variable cylinder volumes 127, 128, 138, 148 to be varied in order to move clipping module 200 via housing 110 into the desired position, the release position, the discharge position and at least two further intermediate positions.

For coupling third and fourth variable cylinder volumes 138, 148, each to a low power source and a high power source, fluid channels (not shown in FIG. 2) are arranged in housing 110, terminating at one end in a respective position in third and fourth variable cylinder volumes 138, 148, and at the other hand on the outside of housing 110, where they are connected to the respective power source by branches 410 to which control valves (not shown) are connected.

In order to connect first and second cylinder volume 127, 128 to a high power source or a low power source, first portion 152 of piston rod 150 comprises an axially trough hole 420 in which a control pin 430 is axially movable supported. Radially aligned pressure channels running from through hole 420 to the outside of first portion 152 of piston rod 150 and terminating on the left and right side of first piston 122. When axially shifting control pin 430, first and second cylinder volumes 127, 128 are coupled to the high pressure source and the low pressure source respectively.

FIG. 2 shows drive device 100 with clipping module 200 in the release position. That means clipping module 200 together with casing brake 240 has been moved into its leftmost position, in which casing brake 240 is removed from filling tube 310. In this position, filling tube 310 may be pivoted away from clipping module 200, e.g. in order to refill tubular casing material to filling tube 310. The release position with regard to the piston/cylinder assembly 120, 130, 140, is described in detail in conjunction with FIG. 3.

Figure 3:
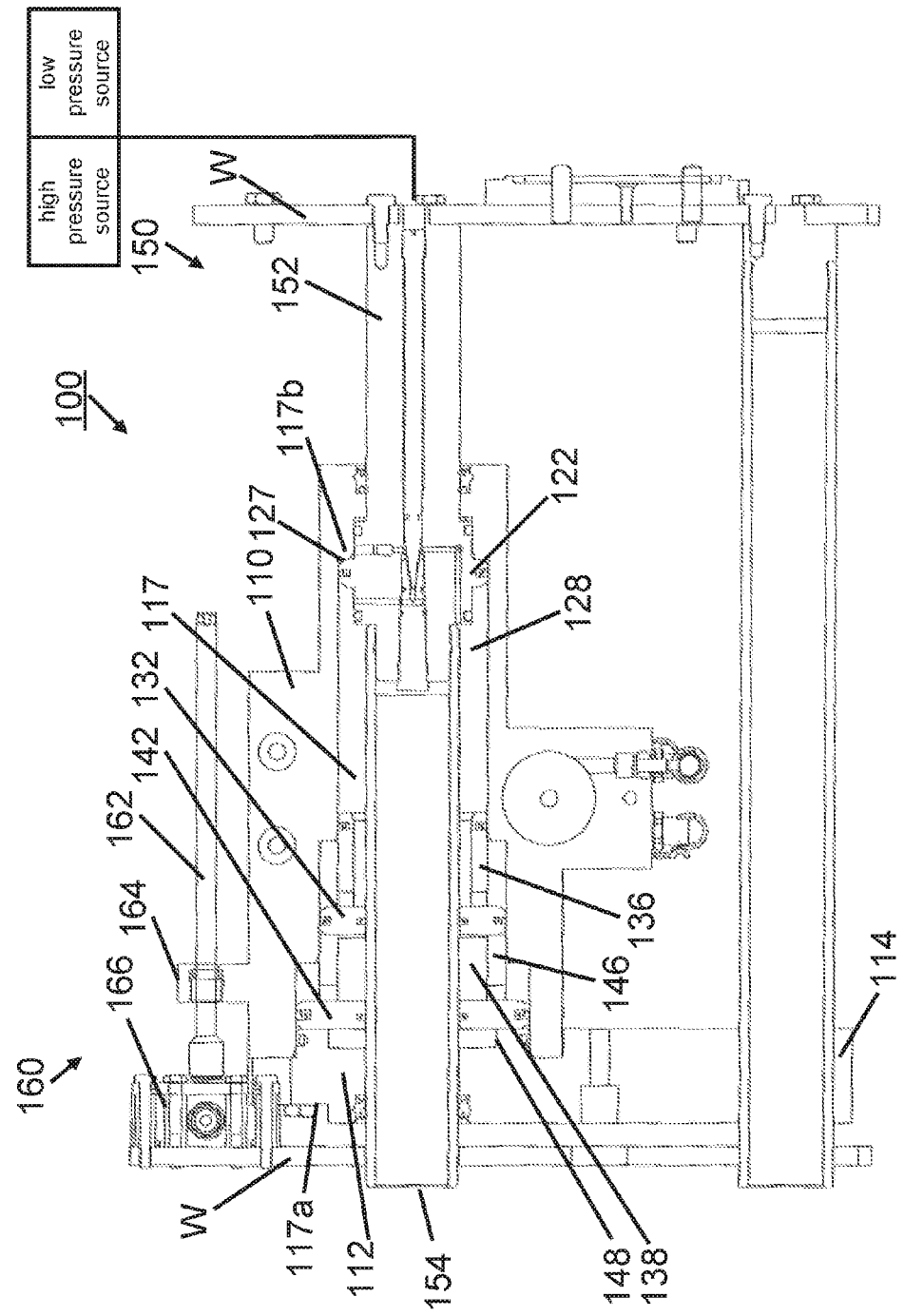
FIG. 3: is a schematic cross-sectional view of the drive device in a vertical plane along line B-B in FIG. 1, with the housing in the release position.

FIG. 3 is a schematic cross-sectional view of drive device 100 in a vertical plane along line B-B in FIG. 1, wherein housing 110 is in the release position as shown in FIG. 2.

In the release position, housing 110 and clipping module 200, respectively, is in the leftmost position, in which filling tube 310 may be pivoted away from clipping module 200.

In this position, the right side of first piston 122 abuts the right end side of first cylinder portion 124. The first variable cylinder volume 127 is reduced to a minimum. Third piston 142 is in its leftmost position abutting against coverage 112 of housing 110. Accordingly, fourth cylinder volume 148 is reduced to a minimum. Also, second piston 132 is in its leftmost position, abutting with its left side via annular ring 146 against third piston 142. Thus, also third cylinder volume 138 is reduced to its minimum.

The release position is reached by connecting second cylinder volume 128 to the high pressure source, whereas first, third and fourth cylinder volumes 127, 138, 148 are connected to the low pressure source.

Figure 4:
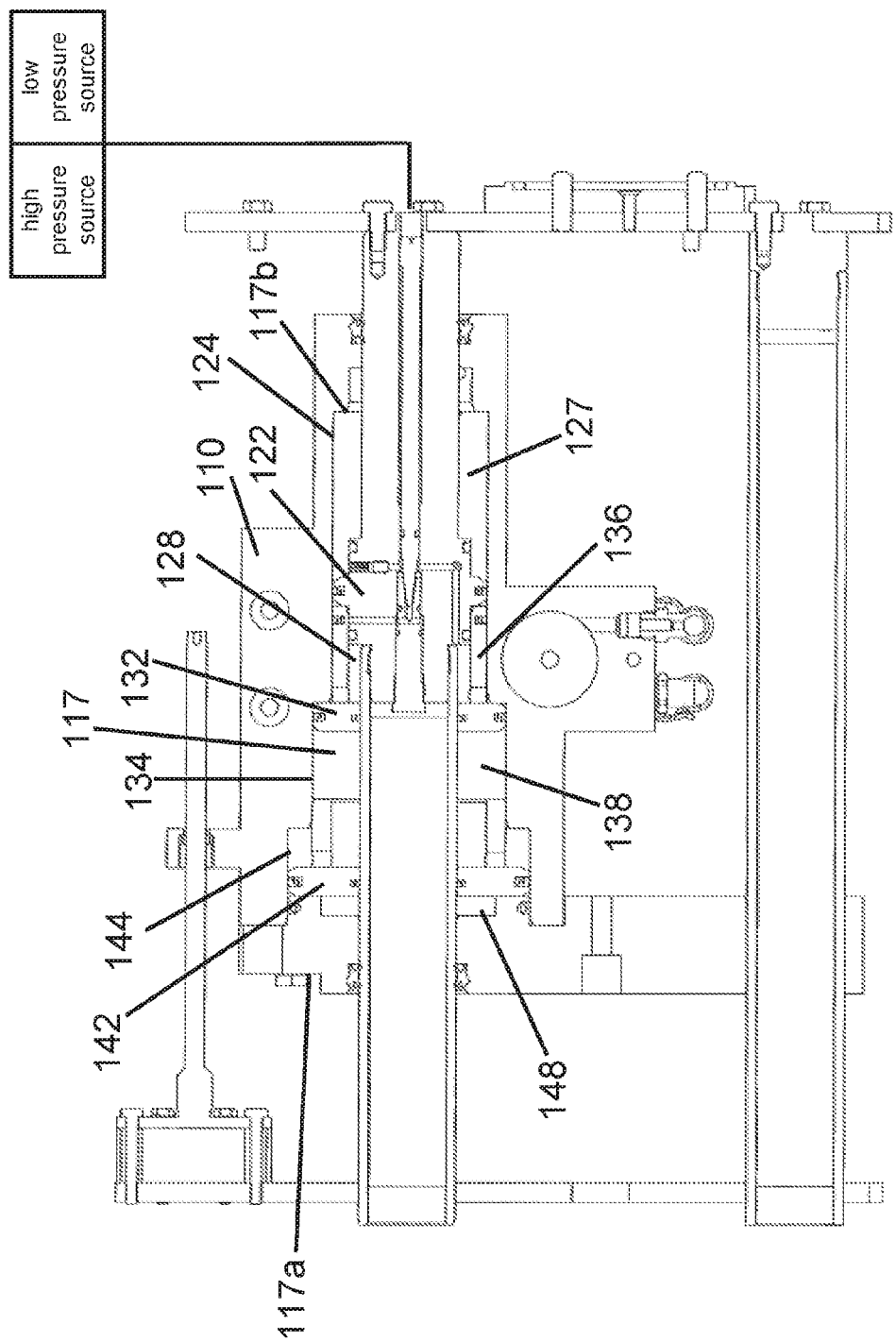
FIG. 4: is a schematic cross-sectional view of the drive device in a vertical plane along line B-B in FIG. 1, with the housing in a first intermediate position.

FIG. 4 is a schematic cross-section view to drive device 100 of FIG. 1 in a vertical plane along line B-B with housing 110 in a first intermediate position.

In the first intermediate position, housing 110 and clipping module 200 are moved from the released position, as shown in FIGS. 2 and 3, about a predetermined distance to the right. The distance between the release position and the first intermediate position corresponds to the difference between the maximum length of the moving paths being provided by first and second cylinder portions 124, 134. When in the first intermediate position, brake ring 242 of casing brake assembly 240 is pushed onto the left end 314 of filling tube 310. That means left end 314 of filling tube 310 is positioned between first and second brake rings 242, 244 of casing brake assembly 240.

In this position, third piston 142 abuts against coverage 112 of housing 110, whereby fourth cylinder volume 148 is reduced to a minimum. Second piston 132 is in its rightmost position abutting with its right side against the step between first and second cylinder portions 124, 134. Annular ring 136 extending from second cylinder 132 towards first piston 122, is shifted into first cylinder portion 124. First piston 122 abuts with its left side against the right end of annular ring 136, reducing the second cylinder volume 128 to a minimum.

To get into this position, third cylinder volume 138 is coupled to the high pressure source, whereas second and fourth cylinder volumes 128, 148 are connected to the low pressure source, and first cylinder volume 127 is decoupled from the low pressure source and coupled to the high pressure source.

FIG. 5 is a schematic cross-section view to drive device 100 of FIG. 1 in a vertical plane along line B-B with housing 110 in a second intermediate position.

The second intermediate position is the filling position in which filling material is fed through filling tube 310 into the tubular casing material stored on filling tube 310. As known, the feeding pressure of the filling material pulls-off the tubular casing material from filling tube 310, when being filled. In this filling position, first and second brake rings 242, 244 are positioned on second end 314 of filling tube 310, for creating a predefined tension to the tubular casing material when being pulled-off from filling tube 310.

As it can be inferred from FIG. 5, in the second intermediate position or the filling position, third piston 142 is in its rightmost position, abutting with its right side against the step between second and third cylinder portions 134, 144, whereby fourth cylinder volume 148 has reached its maximum. Annular ring 146 extending from third piston 142 towards second piston 132 is completely shifted into second cylinder portion 134. Second piston 132 abuts with its left end against annular ring 146, thereby being shifted a short distance away from the step between first and second cylinder portions 124, 134. Said distance corresponds to the difference between the length of second cylinder portion 134 and the axial length of annular ring 146 plus the axial length of second piston 132, and is the length of the moving path of housing 110 when shifted from the first intermediate position into the second intermediate position. First piston 132 abuts with its left side against the right end of annular ring 136.

In the filling position, first and fourth cylinder volumes 127, 148 are coupled to the high pressure source, whereas second and third cylinder volumes 128, 138 are connected to the low pressure source.

FIG. 6 is a schematic cross-sectional view to drive device 100 of FIG. 1 in a vertical plane along line B-B with the housing in the discharge position.

In the discharge position, clipping module 200 is moved into its rightmost position, in which left end 314 of filling tube extends through clipping module 200, at least into the closing area, between gathering means 220, or the clipping tools of clipping tool assembly 210 respectively. Clipping module 200 is moved into this position after a clipping cycle has been finished and the sausage-shaped product just produced has been severed from the supply of tubular casing material stored on filling tube 310. Thereby, the sausage-shaped product just produced is shifted out of the closing area, i.e. towards a discharge device, like a chute or a conveyor, to be removed from the clipping machine.

As it can be seen in FIG. 6, in this position, first, second and third pistons 122, 132, 142 are in their leftmost position. Third piston 142 abuts with its left side against coverage 112, second piston 132 abuts with its left side against the right end of annular ring 146, and first piston 122 abuts with its left side against the right end of annular ring 136. First cylinder volume 127 is at its maximum, whereas second, third and fourth cylinder volumes 128, 138, 148 are at their minimum.

The discharge position is reached by coupling first cylinder volume 127 to the high pressure source and connecting second, third and fourth cylinder volumes 128, 138, 148 to the low pressure source. The movement of housing 110 and clipping module 200 from the discharge position to release position is carried out in reversed order as described above.

The inventive method for reversibly linearly moving clipping module 200 of a clipping machine, between a release position and a discharge position by means of drive device 100 will be described in the following.

For producing sausage-shaped products, clipping module 200 is in the release position as e.g. shown in FIG. 2. In this position, filling tube 310 is pivoted away from clipping module 200 and tubular casing material is positioned on filling tube 310. Thereafter, filling tube 310 is pivoted back into its filling position shown in FIGS. 1 and 2. The tubular casing material is closed at its front end by a first closure clip.

Clipping module 200 is then shifted via the first intermediate position shown in FIG. 4, into the filling position, also denoted as the second intermediate position, shown in FIG. 5.

For clipping module 200 to be moved from the release position into the first intermediate position, third cylinder volume 138 has to be decoupled from the low pressure source and to be coupled to the high pressure source. At the same time or subsequently, second cylinder volume 128 has to be decoupled from the high pressure source and coupled to the low pressure source, and first cylinder volume 127 has to be decoupled from the low pressure source and coupled to the high pressure source. Housing 110 and clipping module 200 are shifted to the right, about a distance corresponding to the moving path of second piston 132 in second cylinder portion 134 and the moving path of first piston 122 in first cylinder portion 124 until abutting against annular ring 136. In this conjunction, it has to be noted that first piston 112 is not moved itself since it is a part of piston rod 150 which, in turn, is attached to framework W of the clipping machine, but housing 110 is moved along piston rod 150 and such first piston 122.

By moving clipping module 200 from the release position into the first intermediate position, first brake ring 242 of casing brake assembly 240 is shifted onto second end 314 of filling tube 310. By further moving clipping module 200 into the filling position, second brake ring 244 is shifted onto second end 314 of filling tube 310.

In order to move clipping module 200 from the first intermediate position into the filling position according to FIG. 5, third cylinder volume 138 is decoupled from the high pressure source and coupled to the low pressure source, and fourth cylinder volume 148 is decoupled from the low pressure source an decoupled to the high pressure source.

Thereby, third piston 142 is moved rightwards and abuts against the step between second and third cylinder portions 134, 144 and shifts housing 110 to the right until second and third pistons 132, 142 are in their closest position to first piston 122, only separated by annular rings 136, 146.

In the filling position, a predetermined portion of filling material is fed through filling tube 310 into the tubular or bag-shaped casing material, the filled casing is gathered by gathering means 220 forming a plait-like portion to the casing material, and one closure clip is applied to the plait-like portion for closing the filled bag-shaped casing. As already mentioned above, it is possible to use the present invention also in conjunction with the tubular casing material wherein two closure clips have to be applied to the plate-like portion. In such a case, the first closure clip closes the end of the tubular casing just produced and facing opposite to the filling direction whereas the second closure clip closes the front end (facing in filling direction F) of the following sausage-shaped product. Subsequently, the completed product just produced is severed from the supply of casing material stored on filling tube 310, e.g. by a cutting device integrated in clipping module 200.

To discharge the severed bag- or sausage-shaped product just produced from the clipping machine, clipping module is moved from the filling position into the discharge position.

To get into this position, when starting at the filling position, only fourth cylinder volume 148 has to be decoupled from the high pressure source and to be coupled to the low pressure source. Thereby, housing 110 is moved to the right until coverage 112 abuts against the left side of third piston 142 by reducing fourth cylinder volume 148 to a minimum.

For starting the next clipping cycle, fourth cylinder volume 148 is decoupled from the low pressure source and coupled to the high pressure source to shift clipping module 200 into the filling position.

For refilling tubular casing material to filling tube 310, clipping module 200 is shifted into the release position as described above.

First, second, third and fourth cylinder volumes 127, 128, 138, 148 have to be separated leak-proof from each other. Thus, as it can be seen in FIGS. 2 to 6, first, second and third pistons 122, 132, 142 comprise sealing elements at their outer and inner surfaces which are movable relative to piston rod 150 and first, second and third cylinder portions 124, 134, 144. Moreover, housing 110 comprises sealing elements in the region where piston rod 150 is guided there through.

It has to be understood that the clipping machine comprises a control unit for controlling the production process. Drive device 100, and in particular, sensor assembly 160 is coupled to the control unit of the clipping machine. The sensor signal sent by sensor assembly 160 may be used to control the production process, i.e. to stop the clipping machine in case that the drive device 100, and thus, clipping module 200, is not in its predefined position. Moreover, the connection and disconnection of drive device 200, and in particular the first, second, third and fourth cylinder volumes 127, 128, 138, 148 to the high pressure source and the low pressure source is controlled by the control unit.

According to the present embodiment of drive device 100, first, second, third and fourth cylinder volumes 127, 128, 138, 148 are coupled to a high presser source, or a low pressure source respectively. It has to be noted, that the low pressure source not necessarily needs to be a pressure source delivering a pressurized fluid, it also may be the surrounding atmosphere and the low pressure is the atmospheric pressure.

Drive device 100 may be driven hydraulically using e.g. oil as the pressurized fluid. Alternatively also air or another a suitable gas may be used for pneumatically driving drive device 100.

The first intermediate position allows casing brake assembly 240 to be partially be shifted onto filling tube 310, namely only first brake ring 242 is shifted onto filling tube 310.

Since this first intermediate position is not essentially for the filling process itself, one of the second or third pistons 132, 142 may be omitted, whereby only three cylinder volumes are given. Accordingly, the number of cylinder portions is reduced to two. This construction allows clipping module 200 to be moved into three positions, a release position, a filling position and a discharge position, accordingly.

Moreover, first and second cylinder volumes 127, 128 have been described as being coupled to the pressure sources by channels running through first part 152 of piston rod 150. Of course, also first and second cylinder volumes 127, 128 may be coupled to the pressure sources by bores in housing 110, corresponding to the bores connecting third and fourth cylinder volumes 138, 148 to the pressure sources.

The invention claimed is:

1. A drive device for reversibly linearly moving a clipping module of a clipping machine between at least four different predefined positions including a release position and a discharge position, and at least two further intermediate positions therebetween, the clipping machine having a filling tube through which a filling material is fed in a filling direction into a tubular or bag-shaped packaging casing stored on the filling tube, the drive device comprising:
a piston/cylinder assembly including:
a first piston for being fixedly arranged relative to a framework of the clipping machine and a housing including a hollow space defining a first cylinder portion in which the first piston is accommodated, the housing is reversibly movable relative to the first piston;
a second piston coaxially aligned to the first piston and reversibly movable in a second cylinder portion of the housing hollow space;
a third piston coaxially aligned to the first piston and reversibly movable in a third cylinder portion of the housing hollow space, the second cylinder portion being between the first cylinder portion and the third cylinder portion;
a piston rod having a central axis coaxially aligned to the first, second, and third cylinder portions, with the first piston fixedly mounted to the piston rod; and
four variable cylinder volumes in the hollow space, a first cylinder volume between the first piston and a first end of the hollow space, a second cylinder volume between the first and the second piston, a third cylinder volume between the second and the third piston, and a fourth cylinder volume between the third piston and a second end of the hollow space;
wherein each cylinder volume is coupled to a pressure source for being varied in order to reversibly move the clipping module coupled to the housing, between the release position and the discharge position, and the intermediate positions therebetween, wherein the clipping module and housing are coupled together such that the movement of the housing causes the movement of the clipping module.

2. The drive device according to claim 1, wherein the first, second and third cylinder portions compose a multi-stage cylinder.

3. The drive device according to claim 1, wherein the second and third pistons are each reversibly slidably secured on the piston rod.

4. The drive device according to claim 3, wherein the second and third pistons are each formed by an annular disc.

5. The drive device according to claim 4, wherein the second and third pistons comprise each a coaxially aligned hollow cylindrical protrusion.

6. The drive device according to any of claims 1, 2, 3, 4 or 5, wherein each of the four variable cylinder volumes is coupled to a high pressure source and a low pressure source by respective coupling means.

7. The drive device according to claim 6, wherein the piston rod comprises channels for connecting the first and second cylinder volume to the high and low pressure sources.

8. The drive device according to claim 7, wherein a control pin is arranged in a central bore of the piston rod, and is axially movable within said central bore, for controlling the connection of the first and second cylinder volumes to the high and low pressure sources.

9. The drive device according to claim 7, wherein the housing comprises channels for connecting the third and fourth cylinder volume to the high and low pressure sources.

10. The drive device according to claim 7, wherein the drive device further comprises a guide bar arranged parallel to the piston rod, for guiding the housing when reversibly moved between the release position and the discharge position.

11. The drive device according to claim 1, further comprises a sensor assembly for sensing the current position of the clipping module.

* * * * *